United States Patent [19]
Latourrette et al.

[11] Patent Number: 4,891,199
[45] Date of Patent: Jan. 2, 1990

[54] PREPARATION OF ZEOLITES OF TYPE ZSM-5

[75] Inventors: Bertrand Latourrette, Le Raincy; Claude Magnier, Paris, both of France

[73] Assignee: Rhone-Poulenc Specialites Chimiques, Courbevoie, France

[21] Appl. No.: 943,861

[22] Filed: Dec. 22, 1986

Related U.S. Application Data

[63] Continuation of Ser. No. 655,076, Sep. 27, 1984, abandoned.

[30] Foreign Application Priority Data

Sep. 28, 1983 [FR] France ................. 8315404

[51] Int. Cl.$^4$ ............................................. C01B 33/28
[52] U.S. Cl. ................................................... 423/328
[58] Field of Search ............... 423/328, 329, 326, 330

[56] References Cited

U.S. PATENT DOCUMENTS

| | | | |
|---|---|---|---|
| 4,164,551 | 8/1979 | Elliot, Jr. ............................. | 423/329 |
| 4,166,099 | 8/1979 | McDaniel et al. ................... | 423/329 |
| 4,175,114 | 11/1979 | Plank et al. ......................... | 423/329 |
| 4,257,885 | 3/1981 | Grose et al. ......................... | 210/691 |
| 4,526,879 | 7/1985 | Dwyer et al. ........................ | 423/329 |
| 4,562,055 | 12/1985 | Arika et al. ......................... | 423/329 |
| 4,578,259 | 3/1986 | Morimoto et al. .................. | 423/329 |

OTHER PUBLICATIONS

Kvei-Tung Chao et al, "Kinetic Studies on the Formation of Zeolite ZSM-5", J. Chem. Soc. Faraday Trans. 1, 1981 77 547-555.

Ryszard Mostowicz et al, "Crystallization of ZSM-5 with Relatively High $(Me_{2/n})_2O/(TPA)_2O$ Reactant Ratios", Zeolites vol. 2, No. 2 Apr. 1982 pp. 143-146.

*Primary Examiner*—John Doll
*Assistant Examiner*—R. Bruce Breneman
*Attorney, Agent, or Firm*—Burns, Doane, Swecker & Mathis

[57] ABSTRACT

Zeolites of type ZSM-5, well suited as absorbents/catalysts, are facilely prepared by (i) intimately admixing a source of alumina with a source of silica, in aqueous reaction medium having a pH ranging from 1 to 7 and wherein the molar ratio $SiO_2/Al_2O_3$ ranges from 5 to 100, (ii) adding a source of alkali metal oxide to the reaction mixture resulting from said stage (i), said combined reaction mixture having a pH ranging from 8 to 12, and thence (iii) crystallizing a zeolite of type ZSM-5 therefrom.

8 Claims, No Drawings

PREPARATION OF ZEOLITES OF TYPE ZSM-5

This application is a continuation of application Ser. No. 655,076 filed Sept. 27, 1984, now abandoned.

BACKGROUND OF THE INVENTION

1. Field of the Invention

The present invention relates to the preparation of zeolites of type ZSM-5.

2. Description of the Prior Art

The zeolites of type ZSM-5 are well known materials which have, in particular, been described in U.S. Pat. No. 3,702,886 and British Patent Specification No. 1,161,974.

These zeolites of type ZSM-5 have been manufactured by a variety of processes. Thus, there has already been proposed, in French Patent No. 1,587,860, a process for the synthesis of ZSM-5 by mixing a source of aluminum, a source of silicon, an inorganic base, namely sodium hydroxide, and an organic compound selected from among compounds containing the tetrapropylammonium ion, the amines or the aminoalcohols, after which crystallization is carried out at a temperature of about 150° C. The principal disadvantages of this process reside firstly in the very long time required for the crystallization and secondly in the use of very expensive organic compounds.

It has also been proposed, for example in U.S. Pat. No. 4,257,885 and in British Patent Specification No. 1,567,948 to carry out the synthesis of a zeolite of type ZSM-5 without using organic compounds containing an ammonium cation. In U.S. Pat. No. 4,257,885, seeds of the zeolite desired to be manufactured are employed, and the reaction is carried out in an aqueous medium. According to British Patent Specification No. 1,567,948, it is also possible to proceed without the seeds, but in that case the synthesis is carried out in an aqueous-alcoholic medium. These processes however suffer from the disadvantage of being lengthy to carry out because of the very slow kinetics of the reactions.

SUMMARY OF THE INVENTION

Accordingly, a major object of the present invention is the provision of an improved process for the preparation of zeolites of type ZSM-5 which can be carried out far less expensively than the known processes which employ quaternary ammonium compounds, and in which the crystallization time is substantially shorter than in the known processes carried out using seed crystals or in an aqueous-alcoholic medium.

Briefly, the present invention features a process for the preparation of a zeolite of type ZSM-5 by intimately admixing, with stirring, a source of silica, a source of alumina and a source of an alkali metal oxide, and thence effecting crystallization, such process being characterized in that the mixing is carried out in two stages:

(i) in a first stage, the source of alumina is mixed with the source of silica. The pH of the reaction mixture must range from 1 to 7, preferably from 2 to 5, and the molar ratio $SiO_2/Al_2O_3$ must range from 5 to 100, preferably from 10 to 60;

(ii) in a second stage, the source of alkali metal oxide is added to the mixture originating from the first stage, and the pH of the reaction mixture has a value ranging from 8 to 12 and preferably from 9 to 11.

DETAILED DESCRIPTION OF THE INVENTION

More particularly according to the present invention, the source of alumina is advantageously selected from among the salts of aluminum and the various forms of hydrated or dehydrated alumina. Among these, sodium aluminate, aluminum chloride, aluminum sulfate, aluminum nitrate, colloidal alumina, boehmite, pseudo-boehmite, hydrargillite, amorphous alumina, transition aluminas and mixtures thereof, are especially representative. One or more sources of alumina too may be used, as desired.

The source of silica employed consistent with the present invention is advantageously selected from among all compounds which are sufficiently reactive to produce the zeolite chemically. For example, water-soluble or water-dissolved silicates are used, such as sodium silicates (waterglass) or hydrated sodium metasilicates, or the sesquisilicate or disilicate, which either may or may not be of the so-called "active" type. It is also possible to employ silica in the colloidal form, for example, aqueous silica suspensions containing 20 to 50% of silica and marketed for example, under the registered trademarks "Ludox", "Nalcoag" or "Syton". The silica can also be introduced in the form of a suspension of a finely divided powder such as that marketed as "Aerosil", or in the form of precipitated silica. It is also possible to employ fluosilicates in the form of inorganic salts, or as the acid.

If desired, a portion of the silica and of the alumina can be introduced in the form of an aluminosilicate.

Typically, the aluminosilicate is employed in an amorphous state.

In the first stage of the process of the invention, the source of alumina is thus mixed with the source of silica in proportions such that the molar ratio $SiO_2/Al_2O_3$ of the mixture ranges from 5 to 100, preferably from 10 to 60 and more preferably from 20 to 50. Moreover, the pH of the medium must range from 1 to 7 and preferably from 2 to 5. In a preferred embodiment of the invention, this pH value is achieved by adding acid to the aluminum salt solution before it is mixed with the source of silica. Such acid is typically selected from among HCl, $HNO_3$ and $H_2SO_4$.

In the second stage of the process of the invention, the source of an alkali metal oxide is added to the mixture resulting from the first stage, while adjusting the pH of the reaction mixture to a value ranging from 8 to 12 and preferably from 9 to 11, the amount of alkali metal oxide introduced being such that the mixture has the following molar ratios: $OH^-/SiO_2$ of from 0.01 to 0.7 and preferably from 0.10 to 0.40; $H_2O/OH^-$ of from 10 to 500 and preferably from 30 to 300.

And in a preferred embodiment of the invention, the source of the alkali metal oxide is advantageously selected from among sodium hydroxide and potassium hydroxide.

Upon completion of this second stage, an easily stirrable homogeneous gel is obtained. This gel is thereafter crystallized in typical and known fashion for obtaining zeolites of type ZSM-5, at a temperature of from 80° C. to 300° C. and more preferably from 120° to 200° C., under autogenous pressure.

The process according to the invention makes it possible to achieve crystallization times which very favorably compare to those required by the aforesaid prior art techniques. Thus, the invention enables achieving crystallization times ranging from 2 hours to 48 hours.

After crystallization, the product zeolite can be subjected to all of the usual stages of washing, drying, calcination and ion exchange, to provide materials which are admirably well suited as absorbents and/or catalysts.

In order to further illustrate the present invention and the advantages thereof, the following specific examples are given, it being understood that same are intended only as illustrative and in nowise limitative.

analysis of the product thus obtained was characterized by a molar ratio $SiO_2/Al_2O_3 = 39.0$.

EXAMPLES 2 TO 9

The procedure followed was similar to that illustrated in Example 1, but with the various parameters having the values reported in the Table below. In every case, a well-crystallized zeolite of ZSM-5 structure, virtually or completely devoid of crystalline impurity, was obtained.

The crystallization times were much shorter than those of the prior art to prepare comparable products.

TABLE

| EXAMPLE | 2 | 3 | 4 | 5 | 6 | 7 | 8 | 9 |
|---|---|---|---|---|---|---|---|---|
| Solution A | | | | | | | | |
| $Al_2(SO_4)_3 \cdot 18 H_2O$ 98% strength | 26.7 | 6.7 | 6.7 | 13.2 | 19.8 | 13.3 | 13.3 | 13.3 |
| $H_2SO_4$ | 56 | 8.2 | 16.4 | 30 | 44.5 | 44.5 | 44.5 | 44.5 |
| $H_2O$ | 135 | 162 | 162 | 108 | 162 | 108 | 108 | 180 |
| Solution B | | | | | | | | |
| Silicate (RP 16N34) | 424 | 84.8 | 84.8 | 170 | 255 | 381.6 | 381.6 | 381.6 |
| $H_2O$ added, in g | 0 | 147 | 147 | 126 | 189 | 57.6 | 57.6 | 108 |
| Solution C | 56 g | 260 g | 260 g | 26 g | 58.8 g | 44 g | 28 g | 127 g |
| | NaOH (40% strength) | NaOH (0.5N) | NaOH (0.5N) | NaOH (40% strength) | NaOH (40% strength) | NaOH (40% strength) | NaOH (40% strength) | NaOH (15% strength) |
| Stage 1 (A + B) | | | | | | | | |
| $SiO_2/Al_2O_3$ | 50 | 40 | 40 | 40 | 40 | 90 | 90 | 90 |
| $pH_1$ | 2.5 | 3.5 | 3.5 | 3.5 | 2 | 2.8 | 2.8 | 3.5 |
| Crystallization | | | | | | | | |
| Temperature | 200° C. | 170° C. | 150° C. | 170° C. | 170° C. | 165° C. | 165° C. | 150° C. |
| Time | 8 hrs | 48 hrs | 24 hrs | 24 hrs | 24 hrs | 24 hrs | 24 hrs | 48 hrs |
| Product obtained | | | | | | | | |
| RX% of ZSM-5 | 95 | 95 | 100 | 100 | 100 | 95 | 95 | 95 |
| Molar ratio of $SiO_2/Al_2O_3$ in the ZSM-5 obtained | 38 | 33 | 35 | 30 | 30 | 69 | 70 | 65 |

EXAMPLE 1

The following solutions were prepared:
Solution A:

| |
|---|
| 26.7 g of $Al_2(SO_4)_3 \cdot 18 H_2O$ |
| 56 g of 98% strength $H_2SO_4$ |
| 135 g of $H_2O$ |

Solution B: 424 g of Na silicate (28.6% of $SiO_2$, 8.6% of $Na_2O$) (marketed by Rhone-Poulenc under the trademark "RP 16N34").

Solution C:
40% strength sodium hydroxide solution
Stage 1:
Solutions A and B were intimately admixed using a mechanical stirrer of Rayneri type. The homogeneous gel thus formed had a molar ratio $SiO_2/Al_2O_3 = 50$ and the $pH_1$ of the mixture was 2.5.

Stage 2:
56 g of solution C were added to the stirred mixture from Stage 1. The fluid mixture had a $pH_2$ of 9.5.

This homogeneous mixture was transferred into an autoclave under pressure and was heated to 150° C. under moderate stirring (100 revolutions per minute). After 24 hours of crystallization at 150° C., the product was filtered off and washed with distilled water. A well-crystallized zeolite of ZSM-5 structure, devoid of crystalline impurity, was obtained. It will be noted that these crystallization times are much shorter than those illustrated in U.S. Pat. No. 4,257,885. The chemical While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a zeolite of type ZSM-5, comprising (i) combining an alumina source with acid; (ii) intimately admixing said acidified source of alumina with a source of silica, in aqueous reaction medium having a pH ranging from 2 to 5 and wherein the molar ratio $SiO_2/Al_2O_3$ ranges from 5 to 100, (ii) adding a source of alkali metal oxide to the reaction mixture resulting from said stage (ii), said combined reaction mixture having a pH ranging from 8 to 12, and thence (iv) crystallizing a zeolite of type ZSM-5 therefrom, said reaction mixture capable of being crystallized in the absence of seeds and in a period of time between about 8 and 48 hours.

2. The process as defined by claim 1, the stage (iii) reaction mixture having a molar ratio $OH^-/SiO_2$ ranging from 0.01 to 0.7, and a molar ratio $H_2O/OH^-$ ranging from 10 to 500.

3. The process as defined by claim 2, said molar ratio $OH^-/SiO_2$ ranging from 0.10 to 0.40, and said molar ratio $H_2O/OH^-$ ranging from 30 to 300.

4. The process as defined by claim 1, the stage (iii) reaction mixture having a pH ranging from 9 to 11.

5. The process as defined by claim 1, the stage (ii) reaction mixture having a molar ratio $SiO_2/Al_2O_3$ ranging from 10 to 60.

6. The process as defined by claim 5, said molar ratio $SiO_2/Al_2O_3$ ranging from 20 to 50.

7. The process as defined by claim 1, the source of alkali metal oxide comprising sodium or potassium hydroxide.

8. The process as defined in claim 1 wherein said acid is $HCl$, $HNO_3$ or $H_2SO_4$.

* * * * *